United States Patent
Choi et al.

(10) Patent No.: US 8,811,266 B2
(45) Date of Patent: Aug. 19, 2014

(54) METHOD FOR UPLINK TRANSMISSION CONTROL AND AN APPARATUS FOR THE SAME IN A WIRELESS COMMUNICATIONS SYSTEM

(75) Inventors: Young Seob Choi, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 13/504,891

(22) PCT Filed: Nov. 1, 2010

(86) PCT No.: PCT/KR2010/007602
§ 371 (c)(1),
(2), (4) Date: Apr. 27, 2012

(87) PCT Pub. No.: WO2011/055943
PCT Pub. Date: May 12, 2011

(65) Prior Publication Data
US 2012/0213189 A1    Aug. 23, 2012

Related U.S. Application Data

(60) Provisional application No. 61/258,170, filed on Nov. 4, 2009, provisional application No. 61/288,817, filed on Dec. 21, 2009.

(30) Foreign Application Priority Data

Mar. 10, 2010  (KR) .................... 10-2010-0021459

(51) Int. Cl.
*H04B 7/185* (2006.01)
*H04J 3/16* (2006.01)

(52) U.S. Cl.
USPC .................................. 370/318; 370/468

(58) Field of Classification Search
CPC ..... H04W 4/00; H04W 52/146; H04W 72/04; H04W 52/18; H04W 16/02; H04W 16/14; H04B 7/185; H04J 3/16
USPC ......... 370/319, 329, 333, 344, 410, 431, 468, 370/318, 310; 455/446, 443, 444, 452, 455/13.4, 524, 525, 134, 135, 63.1, 450
See application file for complete search history.

(56) References Cited

U.S. PATENT DOCUMENTS

| | | |
|---|---|---|
| 2007/0042784 A1 | 2/2007 | Anderson |
| 2008/0064432 A1 | 3/2008 | Park et al. |
| 2009/0185531 A1 | 7/2009 | Chun et al. |
| 2009/0196192 A1 | 8/2009 | Lim et al. |

*Primary Examiner* — Hanh N Nguyen
(74) *Attorney, Agent, or Firm* — Lee, Hong, Degerman, Kang & Waimey

(57) ABSTRACT

A wireless communications system and, more particularly, a method for uplink transmission control and an apparatus for the same in a wireless communications system are disclosed. In a method for performing uplink scheduling for a first user equipment by a first base station, the method includes the steps of receiving, from the first user equipment, information on a frequency band having an uplink interference occurring therein with respect to a second base station; and allocating an uplink resource for the first user equipment based upon the frequency band. Herein, the frequency band having an uplink interference occurring therein with respect to the second base station may be decided based upon uplink scheduling information on a second user equipment of the second base station, and the uplink scheduling information on the second user equipment of the second base station may be acquired by the first user equipment and transmitted to the first base station.

16 Claims, 9 Drawing Sheets

METHOD FOR UPLINK TRANSMISSION CONTROL AND AN APPARATUS FOR THE SAME IN A WIRELESS COMMUNICATIONS SYSTEM

CROSS-REFERENCE TO RELATED APPLICATIONS

This application is the National Stage filing under 35 U.S.C. 371 of International Application No. PCT/KR2010/007602, filed on Nov. 1, 2010, which claims the benefit of earlier filing date and right of priority to Korean Application No. 10-2010-0021459, filed on Mar. 10, 2010, and which also claims the benefit of U.S. Provisional Application Ser. Nos. 61/258,170, filed on Nov. 4, 2009, and 61/288,817, filed on Dec. 21, 2009, the contents of which are all incorporated by reference herein in their entirety.

TECHNICAL FIELD

The present invention relates to a wireless communications system and, more particularly, to a method for uplink transmission control and an apparatus for the same in a wireless communications system.

BACKGROUND ART

FIG. 1 illustrates a heterogeneous network wireless communication system 100 including a macro base station and a micro base station. In the description of the present invention, the term "heterogeneous network" refers to a network wherein a macro base station 110 and a micro base station 121 and 122 co-exist even when the same RAT (Radio Access Technology) is being used.

A macro base station 110 refers to a general base station of a wireless communication system having a broad coverage range and a high transmission power. Herein, the macro base station 110 may also be referred to a macro cell.

The micro base station 121 and 122 may also be referred to as a micro cell, a pico cell, a femto cell, a home eNB, a relay, and so on. More specifically, the micro base station 121 and 122 corresponds to a small-sized version of the macro base station 110. Accordingly, the micro base station 121 and 122 may independently perform most of the functions of the macro base station. Herein, the micro base station 121 and 122 may correspond to an overlay base station, which may be installed in an area covered by the macro base station, or to a non-overlay base station, which may be installed in a shadow area that cannot be covered by the macro base station. As compared to the macro base station 110, the micro base station 121 and 122 has a narrower coverage range and a lower transmission power and may accommodate a smaller number of terminals (or user equipments).

A terminal (or user equipment) 131 may directly receive services from (or be served by) the macro base station 110 (hereinafter referred to as a macro-terminal). And, alternatively, a terminal (or user equipment) 132 may directly receive services from (or be served by) the micro base station 121 (hereinafter referred to as a micro-terminal). In some cases, a terminal 132 existing within the coverage area of the micro base station 121 may receive services from the macro base station 110.

Depending upon whether or not the terminal (or user equipment) has limited access, the micro base station may be categorized into two different types, the first type being a CSG (Closed Subscriber Group) micro base station, and the second type being an OA (Open Access) or OSG (Open Subscriber Group) micro base station. More specifically, the CSG micro base station may serve (or transmit services to) only specific terminals that are authorized, and the OSG micro base station may serve (or transmit services to) all types of terminals without any particular access limitations.

DISCLOSURE OF INVENTION

Technical Problem

In the above-described heterogeneous network, an uplink signal outputted from a terminal being served by a macro base station may cause a strong interference to an adjacent (or neighboring) micro base station of the corresponding terminal. Alternatively, even when a terminal adjacent to a micro base station receives a downlink signal from the macro base station, such signal reception may cause a strong interference to the micro base station.

An object of the present invention is to provide a method for uplink transmission control and an apparatus for the same in a wireless communications system that can reduce inter-cell interference caused by various factors from the heterogeneous network.

Additional objects and features of the present application will be set forth in part in the description which follows and in part will become apparent to those having ordinary skill in the art upon examination of the following or may be learned from practice of the present application.

Solution to Problem

To achieve these objects and other advantages and in accordance with the purpose of the invention, as embodied and broadly described herein, according to an embodiment of the present invention, in a method for performing uplink scheduling for a first user equipment by a first base station, the method includes the steps of receiving information on a frequency band having an uplink interference occurring therein from the first user equipment with respect to a second base station; and allocating an uplink resource for the first user equipment based upon the frequency band. Herein, the frequency band having an uplink interference occurring therein with respect to the second base station may be decided based upon uplink scheduling information on a second user equipment of the second base station, and the uplink scheduling information on the second user equipment of the second base station may be acquired by the first user equipment and transmitted to the first base station.

Also, the frequency band having an uplink interference occurring therein with respect to the second base station may be decided as a frequency band having an uplink frequency band scheduled to the first user equipment overlap with an uplink frequency band scheduled to the second user equipment.

Also, the step of allocating an uplink resource for the first user equipment includes allocating an uplink resource for the first user equipment excluding the frequency band, or setting up an uplink transmission power of the first user equipment in the frequency band to a transmission power level lower than those of other frequency bands.

Also, the step of receiving information on a frequency band having an uplink interference occurring therein with respect to a second base station, includes receiving a sounding reference signal (SRS) in the frequency band from the first user equipment at a transmission power set to a power level lower than those of other frequency bands, or at a transmission power set to '0'.

Also, a transmission power of the SRS may be decided considering uplink scheduling information on the second user equipment of the second base station and a path loss from the first user equipment to the second base station.

Also, the SRS transmission power may be set up differently for each frequency band.

Also, the uplink scheduling information on the second user equipment of the second base station may be acquired by the first user equipment through one of a transmission via broadcasting from the second base station and a transmission via physical channel to the first user equipment from the second base station.

Also, the transmission via physical channel to the first user equipment from the second base station may be performed through a physical downlink control channel (PDCCH) masked by a Radio Network Temporary Identifier (RNTI) for regulating inter-cell interference or by an RNTI of the second user equipment.

Also, the RNTI of the second user equipment may be broadcasted by the second base station, or the RNTI of the second user equipment may be designated to the first user equipment by the first base station as a pre-defined RNTI.

To achieve these objects and other advantages and in accordance with the purpose of the invention, as embodied and broadly described herein, according to another embodiment of the present invention, in a method for transmitting an uplink signal from a first user equipment to a first base station, the method includes the steps of acquiring uplink scheduling information on a second user equipment of a second base station; deciding a frequency band, wherein an uplink transmission from the first user equipment to the first base station causes an interference with the second base station, based upon the uplink scheduling information on the second user equipment of the second base station, and transmitting information on the frequency band to the first base station; receiving uplink resource allocation based upon the frequency band from the first base station; and transmitting an uplink signal to the first base station based upon the allocated resource.

Also, the frequency band having an uplink interference occurring therein with respect to the second base station may be decided as a frequency band having an uplink frequency band scheduled to the first user equipment overlap with an uplink frequency band scheduled to the second user equipment.

Also, the step of receiving uplink resource allocation from the first base station includes receiving uplink resource allocation excluding the frequency band, or setting up an uplink transmission power in the frequency band to a transmission power level lower than those of other frequency bands.

Also, the step of transmitting information on the frequency band having the uplink interference occurring therein with respect to the second base station, includes transmitting a sounding reference signal (SRS) to the first base station at a transmission power set to a power level lower than those of other frequency bands, or at a transmission power set to '0'.

Also, a transmission power of the SRS may be decided considering uplink scheduling information on the second user equipment of the second base station and a path loss from the first user equipment to the second base station.

Also, the SRS transmission power may be set up differently for each frequency band.

Also, the step of acquiring uplink scheduling information on the second user equipment of the second base station may be performed by the first user equipment through one of a transmission via broadcasting from the second base station and a transmission via physical channel to the first user equipment from the second base station.

Also, the transmission via physical channel to the first user equipment from the second base station may be performed through a physical downlink control channel (PDCCH) masked by a Radio Network Temporary Identifier (RNTI) for regulating inter-cell interference or by an RNTI of the second user equipment.

Also, the RNTI of the second user equipment may be broadcasted by the second base station, or the RNTI of the second user equipment may be designated to the first user equipment by the first base station as a pre-defined RNTI.

To achieve these objects and other advantages and in accordance with the purpose of the invention, as embodied and broadly described herein, according to yet another embodiment of the present invention, in a first base station for performing uplink scheduling to a first user equipment, the first base station includes a receiving module configured to receive an uplink signal from the first user equipment; a transmitting module configured to transmit a downlink signal to the first user equipment; and a processor configured to control the receiving module and the transmitting module. Herein, the processor is configured to receive information on a frequency band having an uplink interference occurring therein from the first user equipment with respect to a second base station through the receiving module, and to allocate an uplink resource for the first user equipment based upon the frequency band. Herein, the frequency band having an uplink interference occurring therein with respect to the second base station may be decided based upon uplink scheduling information on a second user equipment of the second base station, and the uplink scheduling information on the second user equipment of the second base station may be acquired by the first user equipment and transmitted to the first base station.

To achieve these objects and other advantages and in accordance with the purpose of the invention, as embodied and broadly described herein, according to a further embodiment of the present invention, in a first user equipment for transmitting an uplink signal to a first base station, the first user equipment includes a receiving module configured to receive a downlink signal from the first base station; a transmitting module configured to transmit an uplink signal to the first base station; and a processor configured to control the receiving module and the transmitting module. Herein, the processor is configured to acquire uplink scheduling information on a second user equipment of a second base station; decide a frequency band, wherein an uplink transmission from the first user equipment to the first base station causes an interference with the second base station, based upon the uplink scheduling information on the second user equipment of the second base station, and transmit information on the frequency band to the first base station through the transmitting module; receive uplink resource allocation based upon the frequency band from the first base station; and transmit an uplink signal to the first base station based upon the allocated resource through the transmitting module.

It is to be understood that both the foregoing general description and the following detailed description of the present invention are exemplary and explanatory and are intended to provide further explanation of the invention as claimed.

Advantageous Effects of Invention

According to the present invention, a method for uplink transmission control and an apparatus for the same in a wireless communications system that can reduce inter-cell interference occurring in the heterogeneous network are provided.

Additional advantages of the present application will be set forth in part in the description which follows and in part will become apparent to those having ordinary skill in the art upon examination of the following or may be learned from practice of the present application.

BRIEF DESCRIPTION OF DRAWINGS

The accompanying drawings, which are included to provide a further understanding of the invention and which are incorporated in and constitute a part of this application, illustrate embodiment(s) of the invention and together with the description serve to explain the principle of the invention. In the drawings.

BEST MODE FOR CARRYING OUT THE INVENTION

Figure 1:
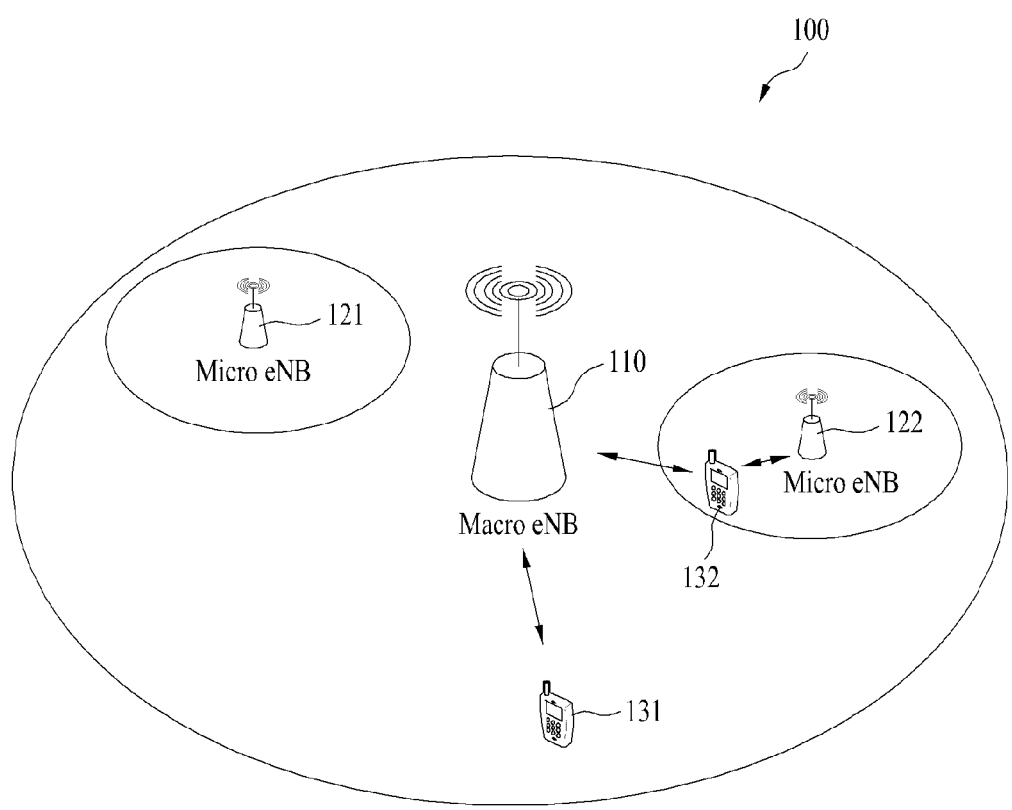
FIG. 1 illustrates a general view of a wireless communications system.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

Figure 2:
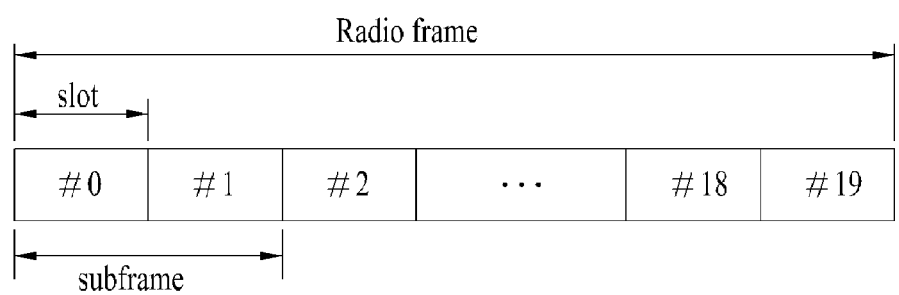
FIG. 2 illustrates an exemplary structure of a radio frame being used in a 3GPP LTE system.

FIG. 2 illustrates an exemplary structure of a radio frame being used in a 3GPP LTE system. One radio frame includes 10 sub-frames, and one sub-frame includes 2 slots in a time domain. The time for transmitting one sub-frame is defined as a Transmission Time Interval (TTI). For example, one sub-frame may have the length of 1 ms, and one slot may have the length of 0.5 ms. One slot may include a plurality of OFDM symbols in the time domain. Since the 3GPP LTE system uses the OFDMA method during a downlink, the OFDM symbol may indicate one symbol length. During an uplink, one symbol may be referred to as an SC-FDMA symbol or a symbol length. A Resource Block (RB) corresponds to a resource allocation unit, and, in a slot, the resource block (RB) includes a plurality of consecutive sub-carriers. However, the above-described radio frame structure is merely exemplary. Therefore, the number of sub-frames included in a radio frame, the number of slots included in one sub-frame, or the number of OFDM symbols being included in one slot may be varied in many different ways.

Figure 3:
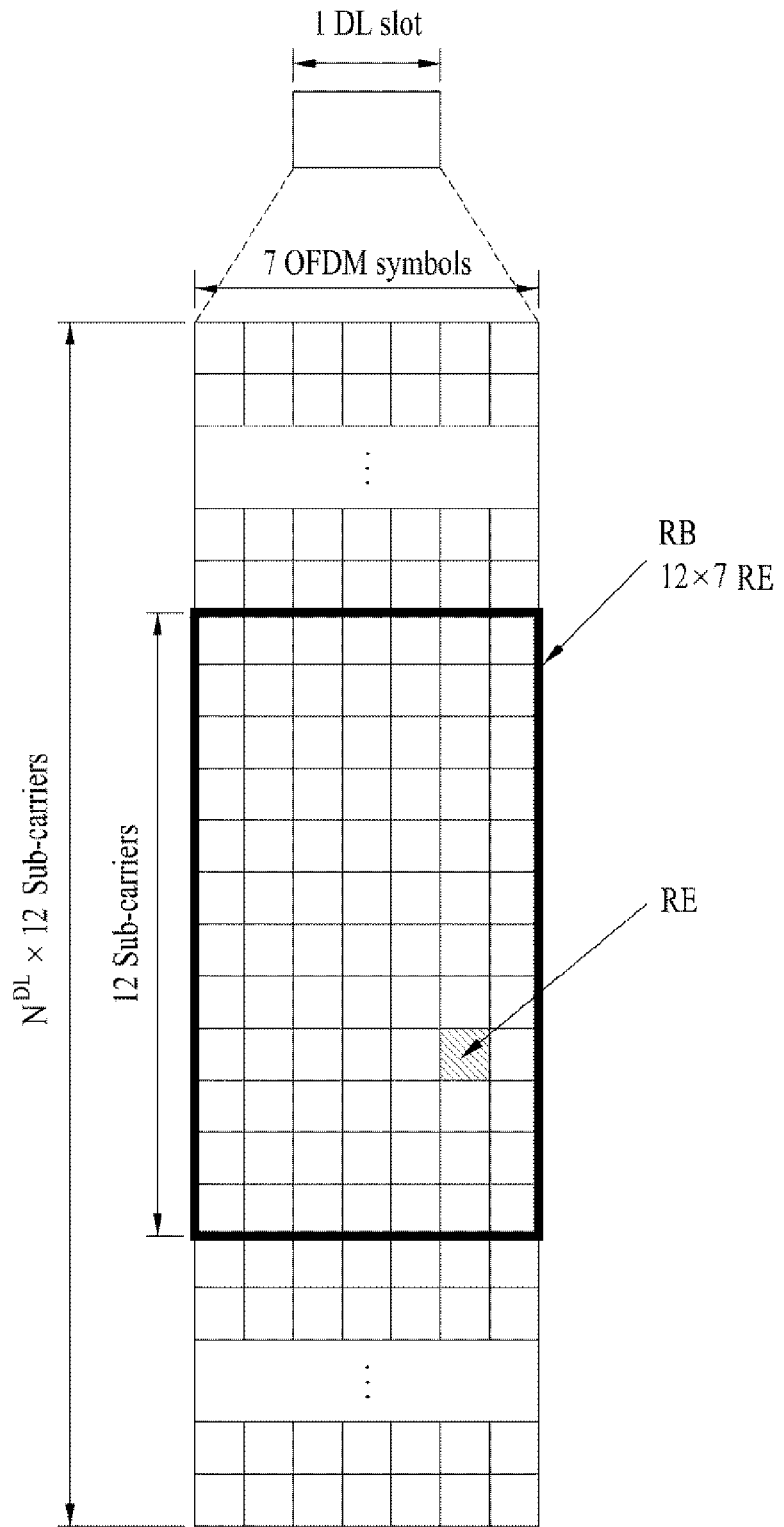
FIG. 3 illustrates a resource grid of a downlink slot.

FIG. 3 illustrates a resource grid of a downlink slot. Although it is shown in FIG. 3 that one downlink slot includes 7 OFDM symbols in a time domain, and that one resource block (RB) includes 12 sub-carriers in a frequency domain, this is merely exemplary. And, therefore, the present invention will not be limited only to the example presented in FIG. 3. For example, in case of a normal Cyclic Prefix (CP), one slot includes 7 OFDM symbols. Alternatively, in case of an extended Cyclic Prefix (extended-CP), one slot may include 6 OFDM symbols. Referring to FIG. 3, each element configuring the resource grid is referred to as a resource element (RE). One resource block includes 12×7 resource elements. An NDL number of resource blocks included in a downlink slot may vary in accordance with a downlink transmission bandwidth. The structure of an uplink slot may be identical to the above-described structure of the downlink slot.

Figure 4:
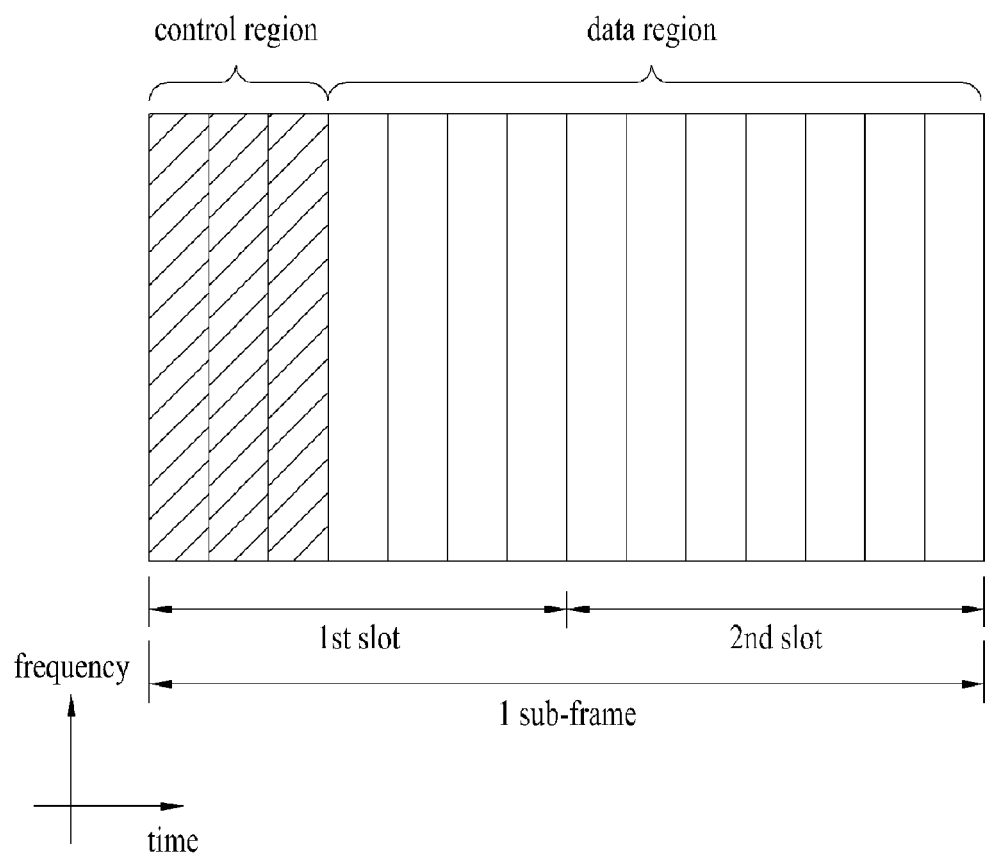
FIG. 4 illustrates an exemplary structure of a downlink sub-frame.

FIG. 4 illustrates an exemplary structure of a downlink sub-frame. A maximum of 3 OFDM symbols located at the front portion of a first slot within one sub-frame corresponds to a control region wherein a control channel is allocated (or assigned). The remaining OFDM symbols correspond to a data region wherein a Physical Downlink Shared Channel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a sub-frame and being used in the control channel transmission within the sub-frame. As a response to an uplink transmission, the PHICH includes HARQ ACK/NACK signals. The control information being transmitted through the PDCCH is referred to as Downlink Control Information (DCI). Herein, the DCI may include uplink or downlink scheduling information or may include an uplink transmission power control command on a certain terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCE corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or usage of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to a system information (more specifically, a system information block (SIB)), a system information identifier, and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

Figure 5:
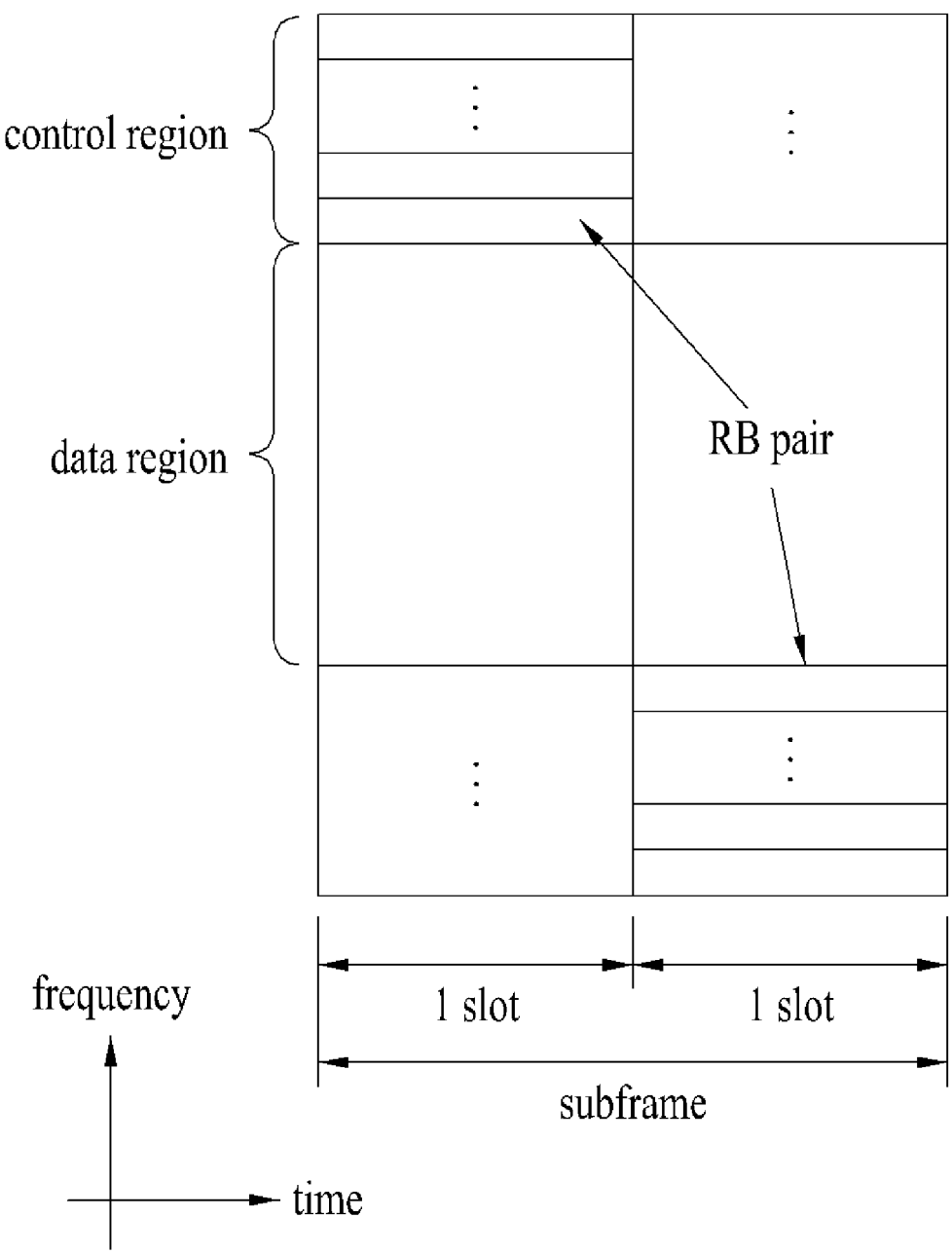
FIG. 5 illustrates an exemplary structure of an uplink sub-frame.

FIG. 5 illustrates an exemplary structure of an uplink sub-frame. In a frequency domain, an uplink sub-frame may be divided into a control region and a data region. A Physical Uplink Control Channel (PUCCH) including uplink control information is allocated to the control region. And, a Physical Uplink Shared Channel (PUSCH) including user data is allocated to the data region. In order to maintain the single carrier property, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different sub-carrier for 2 slots. This may be referred to as the resource block pair, which is allocated to the PUCCH, as being "frequency-hopped" at the slot boundary.

Carrier Aggregation

In a general wireless communications system, even when the bandwidth for each of an uplink and a downlink is set up differently, only a single carrier is being taken into consideration. For example, based on the single carrier structure, the number of carriers configuring each of the uplink and the downlink respectively corresponds to 1. And, a wireless communications system, wherein the bandwidth of the uplink and the bandwidth of the downlink are generally symmetrical to one another, may be provided.

The ITU (International Telecommunication Union) is requesting the candidate technology of IMT-Advanced to support a more expanded bandwidth as compared to that of the conventional wireless communications system. However, with the exception for some areas throughout the world, there still exist many difficulties in allocating a large bandwidth frequency. Therefore, in order to resolve such difficulties, a carrier aggregation (also referred to as bandwidth aggregation or spectrum aggregation) technology is currently under development. The carrier aggregation technology corresponds to a technology developed for an efficient usage of small segmented bands. More specifically, a plurality of small bands is physically grouped in the frequency domain so that the group of segmented bands can be logically used as one large band.

The carrier aggregation technology is adopted so as to support an increasing throughput, to prevent an increase in the cost caused by the addition of a broadband RF device, and to ensure backward compatibility with the conventional system. More specifically, carrier aggregation refers to a technology enabling a user equipment and a base station to exchange data to and from one another through multiple groups of carriers of a bandwidth unit defined by the conventional wireless communications system (e.g., the LTE system in case of the LTE-A system, and the IEEE 802.16e system in case of the IEEE 802.16m system). Herein, the carrier of the bandwidth unit defined by the conventional wireless communications system may be referred to as a component carrier (CC). For example, the carrier aggregation technology may include a technology supporting a system bandwidth of up to a maximum of 100 MHz by grouping a maximum of 5 component carriers, even when one component carrier supports the bandwidth of 5 MHz, 10 MHz or 20 MHz.

In the following description of the carrier aggregation technology, the base station may represent the macro base station or the micro base station.

A downlink carrier aggregation may be described as supporting downlink transmission from the base station to the user equipment by using a frequency domain resource (a sub-carrier or Physical Resource Block (PRB)) of at least one carrier bands within a time domain resource (a sub-frame unit). And, an uplink carrier aggregation may be described as supporting uplink transmission from the user equipment to the base station by using a frequency domain resource (a sub-carrier or PRB) of at least one carrier bands within a time domain resource (a sub-frame unit).

In order to support carrier aggregation, a connection between the base station and the user equipment is required to be set up, or a preparation for a connection set-up between the base station and the user equipment is required to be made, so that a control channel (PDCCH or PUCCH) and/or a shared channel (PDSCH or PUSCH) can be transmitted. In order to perform such connection/connection set-up for each specific terminal, a measurement and/or reporting process on the carrier is required to be performed. And, component carriers corresponding to the targets of such carrier measurement and/or reporting, may be assigned (or allocated). More specifically, component carrier assignment refers to setting up component carriers (i.e., designating number component carriers and component carrier index) that are used for uplink/downlink transmissions, among the uplink/downlink component carriers configured in the base station, while taking into consideration the capability of the specific terminal and the system environment.

System Information

The system information is divided into a master information block (MIB) and a number of system information blocks (SIBs). The MIB defines the most essential physical layer information of a cell required for receiving further system information. SIB type 1 includes information relevant when evaluating if a user equipment is allowed to access a cell and defines the scheduling of other system information blocks.

The MIB is carried on a broadcast channel (BCH), while all other SI messages are dynamically carried on downlink shared channel (DL-SCH) where they can be identified through the SI-RNTI (System Information RNTI). Both the MIB and SIB type 1 use a fixed schedule with a periodicity of 40 ms and 80 ms while the scheduling of other SI messages is flexible and indicated by the SIB type 1. Moreover, details disclosed in paragraph 7.4 of the 3GPP TS 36.300 V8. 10.0 (2009-9) are incorporated by reference for other details related to the system information.

Uplink Power Control

In a wireless communication system, the object of power control is to ensure a Signal-to-Noise Ratio (SNR) required by the system by compensating for a path loss and fading of a channel and also to provide a high system capability through an appropriate rank adaptation. Furthermore, an inter-cell interference may be controlled (or adjusted) by the power control.

In the conventional system, the uplink power control is based on a closed-loop correction and/or an open-loop power control. Herein, the open-loop power control is processed by the user equipment (UE), and the closed-loop correction is performed by a power control command from the base station (evolved Node B (eNB)).

An uplink Transmit Power Control (TPC) command transmitted from the base station may be defined in a DCI format of the PDCCH.

Figure 6:
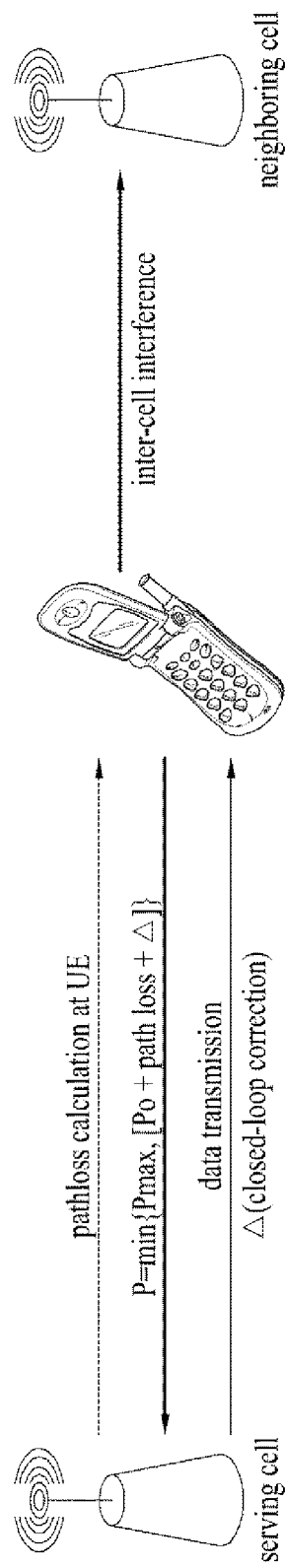
FIG. 6 illustrates a general view describing the basic concept of an uplink power control.

FIG. 6 illustrates a general view describing the basic concept of an uplink power control.

Referring to FIG. 6, the uplink power may be measured by a user equipment through a closed-loop method, and the base station may control the uplink power by using a closed-loop correction factor Δ. The power of an uplink shared channel (PUSCH) may be obtained by using Equation 1 shown below.

Math FIG. 1

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad [\text{Math.1}]$$

In Equation 1, the unit of $P_{PUSCH}(i)$ may be expressed as dBm. Referring to Equation 1, i indicates a time index (or a sub-frame index), $P_{CMAX}$ indicates the maximum allowable power, and the maximum allowable power follows (i.e., varies in accordance with) the class of the user equipment. Additionally, $M_{PUSCH}(i)$ is decided in accordance with the assigned resource block. Herein, the value of $M_{PUSCH}(i)$ ranges from 1 to 110, and the value of $M_{PUSCH}(i)$ is updated in each sub-frame. Also, $\alpha(j) \cdot PL$ corresponds to a formula for path loss compensation. Herein, PL represents a downlink path loss that is measured by the user equipment, and α indicates to a scaling value, which corresponds to a value less than or equal to 1, and which can be expressed as a value of 3 bits. More specifically, if α is equal to 1, this indicates that the path loss has been completely compensated. Alternatively, if α is less than 1, this indicates that the path loss has been partially compensated.

$P_{O\_PUSCH}(j)$ may be calculated by using Equation 2 shown below.

Math FIG. 2

$$P_{O\_PUSCH}(j) = P_{O\_NOMINAL\_PUSCH}(j) + P_{O\_UE\_PUSCH}(j) \quad [\text{Math.2}]$$

Herein, a cell-specific component $P_{O\_NOMINAL\_PUSCH}(j)$ is provided by a higher layer, and a UE-specific component $P_{O\_UE\_SPECIFIC}(j)$ is provided by the higher layer.

In Equation 1, f(i) corresponds to a specific parameter of the user equipment that is controlled by the base station. Herein, f(i) may be calculated by using Equation 3 shown below.

Math FIG. 3

$$f(i)=f(i-1)+\delta_{PUSCH}(i-K_{PUSCH}) \qquad [\text{Math.3}]$$

As shown in Equation 3, $\delta_{PUSCH}$ corresponds to a UE-specific correction value. Herein, $\delta_{PUSCH}$ may also be referred to as a transmit power control (TPC) command. $\delta_{PUSCH}$ may be included in the PDCCH of a DCI format 0 or may be jointly coded with other TPC commands in the PDCCH of a DCI format 3/3A.

Accumulated values of $\delta_{PUSCH}$ dB that is signaled over the PDCCH of the DCI format 0 may be given as shown in Table 1 below. Additionally, the accumulated values of $\delta_{PUSCH}$ dB that is signaled over the PDCCH of the DCI format 3 may also be given as shown in Table 1 below.

TABLE 1

| TPC Command Field in DCI format 0/3 | Accumulated $\delta_{PUSCH}$ [dB] | Absolute $\delta_{PUSCH}$ only DCI format 0 |
| --- | --- | --- |
| 0 | −1 | −4 |
| 1 | 0 | −1 |
| 2 | 1 | 1 |
| 3 | 3 | 4 |

Meanwhile, the power control for the uplink control channel (PUCCH) may be defined as Equation 3 shown below.

Math FIG. 4

$$P_{PUCCH}(i)=\min\{P_{CMAX},P_{O\_PUCCH}+PL+h(n_{CQI},n_{HARQ})+\Delta_{F\_PUCCH}(F)+g(i)\} \qquad [\text{Math.4}]$$

As shown in Equation 4, the unit of $P_{PUCCH}(i)$ may be expressed as dBm. Referring to Equation 3, $$\Delta_{F\_PUCCH}(F)$$

is provided by a higher layer, and each value of $$\Delta_{F\_PUCCH}(F)$$

corresponds to a PUCCH format (F) related with PUCCH format 1a. Additionally, $$h(n_{CQI},n_{HARQ})$$

is a value subordinate to the PUCCH format, and $n_{CQI}$ corresponds to a number information bit for Channel Quality Information (CQI). And, $n_{HARQ}$ corresponds to a number of Hybrid Automatic Repeat request (HARQ) bits.

PUCCH formats 1, 1a, and 1b respectively satisfy Equation 5 shown below.

Math FIG. 5

$$h(n_{CQI},n_{HARQ})=0 \qquad [\text{Math.5}]$$

And, PUCCH formats 2, 2a, and 2b and a normal cyclic prefix (CP) respectively satisfy Equation 6 shown below.

Math FIG. 6

$$h(n_{CQI},n_{HARQ}) = \begin{cases} 10\log_{10}\left(\dfrac{n_{CQI}}{4}\right) & \text{if } n_{CQI} \geq 4 \\ 0 & \text{otherwise} \end{cases} \qquad [\text{Math. 6}]$$

Furthermore, PUCCH format 2 and an extended cyclic prefix (extended-CP) respectively satisfy Equation 7 shown below.

Figure 7:
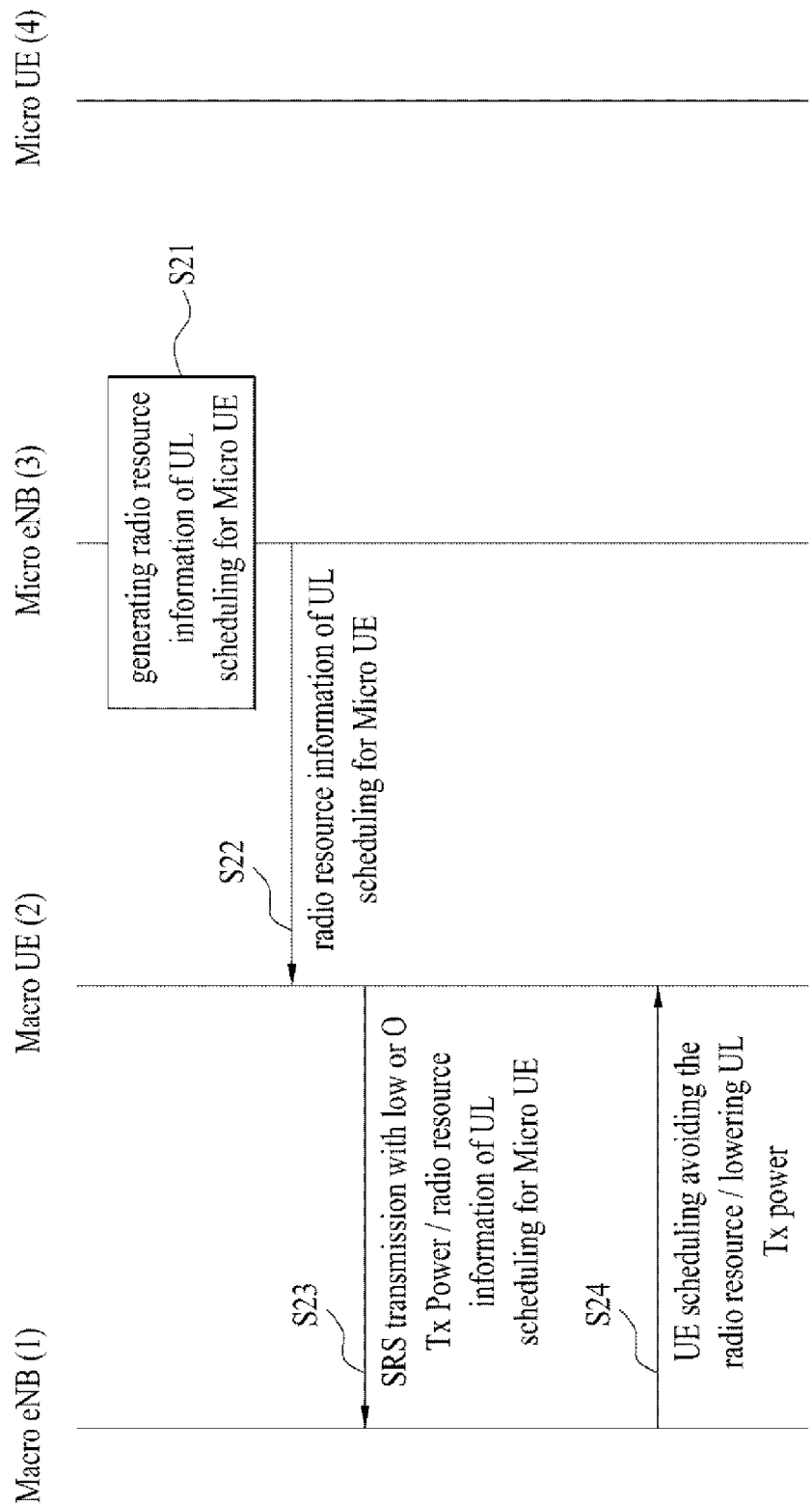
FIG. 7 illustrates a signal flow chart showing an uplink transmission control method according to an embodiment of the present invention.

Math FIG. 7

$$h(n_{CQI},n_{HARQ}) = \begin{cases} 10\log_{10}\left(\dfrac{n_{CQI}+n_{HARQ}}{4}\right) & \text{if } n_{CQI}+n_{HARQ} \geq 4 \\ 0 & \text{otherwise} \end{cases} \qquad [\text{Math. 7}]$$

Meanwhile, $P_{O\_PUCCH}(j)$ represents a parameter configured of a sum of $P_{O\_NOMINAL\_PUCCH}(j)$ and $P_{O\_NOMINAL\_SPECIFIC}(j)$. Herein, $P_{O\_NOMINAL\_PUCCH}(j)$ is provided to a specific cell by a higher layer, and $P_{O\_UE\_SPECIFIC}(j)$ is provided to a specific user equipment cell by the higher layer.

Referring to Equation 4, g(i) represents a current PUCCH power control adjustment state. More specifically, g(i) may be calculated by using Equation 8 shown below.

Figure 8:
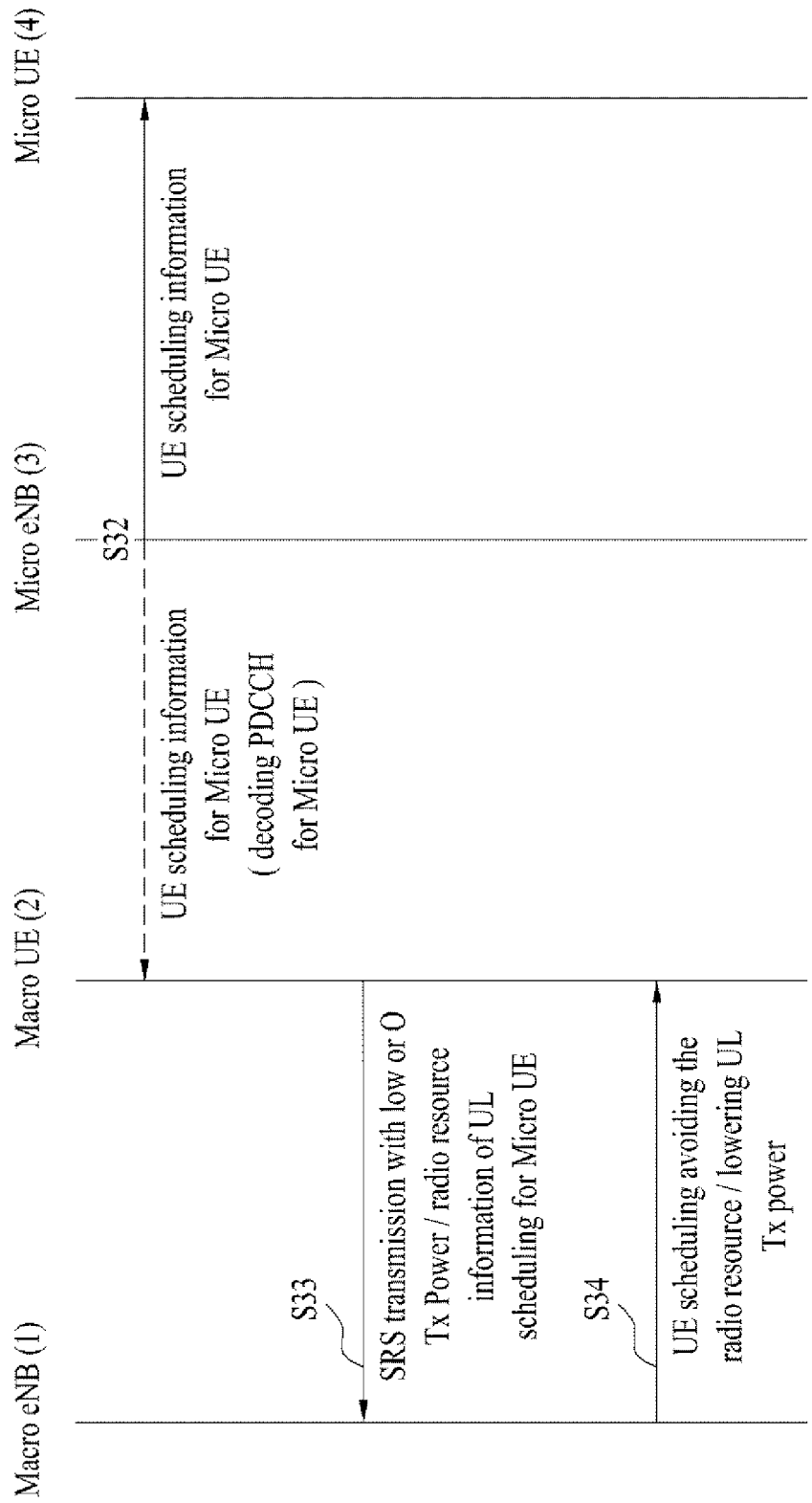
FIG. 8 illustrates a signal flow chart showing an uplink transmission control method according to another embodiment of the present invention.

Math FIG. 8

$$g(i) = g(i-1) + \sum_{m=0}^{M-1} \delta_{PUCCH}(i-k_m) \qquad [\text{Math. 8}]$$

As shown in Equation 9, $\delta_{PUCCH}$ corresponds to a UE-specific correction value. The $\delta_{PUCCH}$ may also be referred to as a Transmission Power Control (TPC) command. Herein, the $\delta_{PUCCH}$ is included in the PDCCH along with the DCI format. Alternatively, the $\delta_{PUCCH}$ may be jointly coded with a specific PUCCH correction value of another user equipment so as to be transmitted over the PDCCH along with the DCI format 3/3A. A CRC parity bit of the DCI format 3/3A may be scrambled with a Radio Network Temporary Identifier (TPC-PUCCH-RNTI).

Meanwhile, being added to the PUCCH and the PUSCH, the power of a Sounding Reference Signal (SRS) may be controlled by using Equation 9 shown below.

Figure 9:
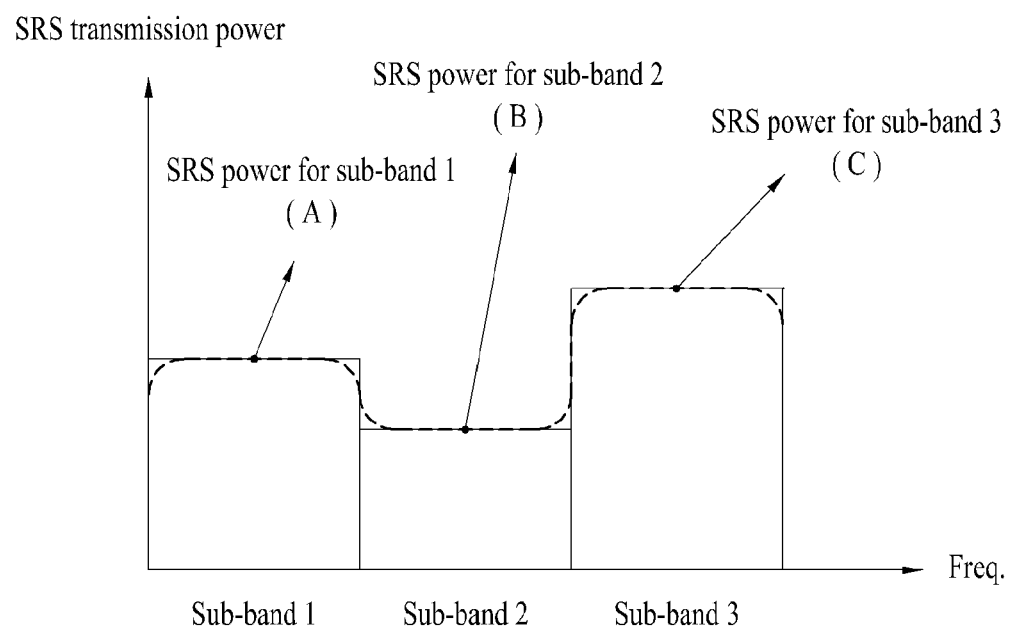
FIG. 9 illustrates an exemplary SRS transmission power according to an embodiment of the present invention.

Math FIG. 9

$$P_{SRS}(i)=\min\{P_{CMAX},P_{SRS\_OFFSET}+10\log_{10}(M_{SRS})+P_{O\_PUSCH}(j)+\alpha(j)\cdot PL+f(i)\} \qquad [\text{Math.9}]$$

Referring to Equation 9, the unit of $P_{SRS}(i)$ is expressed as dBm. Herein, i indicates a time index (or sub-frame index), and $P_{CMAX}$ indicates the maximum available charging power, and the maximum available charging power follows (i.e., varies in accordance with) the class of the user equipment. $P_{SRS\_OFFSET}$ corresponds to a 4-bit parameter provided to a specific terminal (or user equipment) being semi-statically determined by a higher layer. $M_{SRS}$ corresponds to an SRS transmission bandwidth of sub-frame i being expressed as the number of resource blocks. Furthermore, f(i) represents a current power control adjustment for the PUSCH in the form of a function. $P_{O\_PUCCH}(j)$ corresponds to a parameter configured of the sum of $P_{O\_NOMINAL\_PUCCH}(j)$ and $P_{O\_NOMINAL\_SPECIFIC}(j)$. Herein, the $P_{O\_NOMINAL\_PUSCH}(j)$ is provided to a specific cell by a higher layer, and the $P_{O\_UE\_SPECIFIC}(j)$ is provided to a specific terminal by a higher layer. Herein, a value j for a PUSCH transmission (or re-transmission) corresponding to a dynamically scheduled uplink grant is given as '1'. $\alpha(j)\cdot PL$ indicates a formula for a path loss compensation, wherein PL indicates a downlink path loss being measured by a user equipment, and α indicates to a scaling value, which corresponds to a value less than or equal to 1, and which can be expressed as a value of 3 bits. More specifically, if α is equal to 1, this indicates that the path loss has been completely compensated. Alternatively, if α is less than 1, this indicates that the path loss has been partially compensated. When j is equal to '1', α∈{0, 0.4, 0.5, 0.6, 0.7, 0.8, 0.9, 1} corresponds to a 3-bit cell-specific parameter being provided by a higher layer. Furthermore, PL corresponds to a downlink path loss measurement value, which is calculated by the user equipment. Herein, the unit of the downlink path loss measurement value is dB.

As described above, as compared to a homogeneous network environment wherein only macro base stations (or only micro base stations) exist, a more critical inter-cell interference may occur in a heterogeneous network, wherein a macro base station co-exists with a micro base station. For example, due to a difference in the maximum transmission power of the base station (eNB), a downlink (DL) serving cell (e.g., a macro base station) selected based upon a reception signal power may be different from an uplink (UL) serving cell (e.g., a micro base station) selected based upon a path loss.

For example, it is assumed that a user equipment is positioned to be more adjacent to the micro base station than to the macro base station. In this case, since the transmission power of the macro base station is greater (or higher) than the transmission power of the micro base station, even though the user equipment is positioned closer to the micro base station, the user equipment may recognize the strength of the downlink signal of the macro base station as being greater than the strength of the downlink signal of the micro base station. Thus, the macro base station may be selected as the serving cell. In this case, when the user equipment performs an uplink transmission to the macro base station, due to a large distance between the macro base station and the user equipment, the user equipment may transmit the uplink signal to the macro base station by using a greater transmission power level in order to compensate for the distance between the macro base station and the user equipment. Here, due to the uplink transmission performed by using a high transmission power level, the micro base station located near the user equipment may experience a strong interference.

More specifically, when the DL serving cell and the UL serving cell are decided based upon the reception signal power of the user, as in the conventional homogeneous network, and when the macro-terminal being served by the macro base station is positioned to be more adjacent to the micro base station than the macro base station, the UL signal of the macro-terminal may cause a strong interference to the micro base station. Similarly, since the distance between the user equipment and the interfering cell is also close in the DL channel, an inter-cell interference may occur between the micro base station and the macro base station.

Additionally, in case the micro base station corresponds to a CSG micro base station configured to serve only specific terminals, even if the macro-terminal is located within the coverage area of the micro base station, the macro-terminal cannot receive any DL/UL service from the micro base station. Moreover, since the macro-terminal still performs communication with the macro base station, a critical interference may occur. For example, when a specific macro-terminal is moved to a position more adjacent to the CSG micro base station, due to the uplink signal being transmitted from the corresponding terminal to the macro base station, a critical interference may occur in the uplink of the micro base station.

According to the conventional 3GPP LTE system, an X2 interface is provided between the base stations so that information exchange can be easily realized between the base stations. In this case, by using an overload indicator and a high interference indicator being transmitted through the X2 interface, the scheduling information between the base stations may be controlled. This is a method that can be applied only when communications via the X2 interface is available between the base stations. However, the X2 interface cannot be provided between heterogeneous networks, such as the macro base station and the micro base station. For example, in case of a femto cell, the X2 interface may not be provided between the femto cell and the macro base station. In this case, since the exchange of scheduling information cannot be easily performed between the base stations, the problem of inter-cell interference may occur herein.

In order to mitigate interference occurring in a heterogeneous network, and, most particularly, in order to mitigate uplink interference, the present invention proposes a method of controlling or adjusting an uplink transmission of a macro-terminal by a macro base station. The basic principle of the present invention relates to having the macro-terminal acquire radio resource information on an uplink scheduling of a terminal (micro-terminal) being served by a micro base station. Then, the macro-terminal may determine the uplink resource information that can cause an interference with the micro base station, and report the determined uplink resource information to the macro base station, the macro base station may schedule the uplink resource of the macro-terminal to mitigate the interference to the micro base station.

FIG. 7 and FIG. 8 respectively describe a signal flow between a macro base station, a macro-terminal, a micro base station, and a micro-terminal and also describe the operations in each entity. In FIG. 7 and FIG. 8, the heterogeneous network has been simplified by being depicted as a macro cell and a micro cell, so as to simplify and clarify the description of the present invention. Also, it is shown in FIG. 7 and FIG. 8 that only one macro-terminal and one micro-terminal exist in the heterogeneous network. However, the present invention will not be limited only to the example given herein.

FIG. 7 illustrates a signal flow chart showing an uplink transmission control method according to an embodiment of the present invention.

Referring to FIG. 7, the micro base station (3) generates information on the resource (e.g., frequency resource, component carrier, and so on) that is to be used in the uplink scheduling of the micro-terminal (4), which is served by the micro base station (S21). Herein, for example, the micro-terminal scheduling resource information may be provided as information of a bitmap format, which can identify the corresponding resource from the entire frequency resource. In another example, in case the micro base station has a predetermined pattern of the resource that is to be used in an uplink transmission, the micro-terminal scheduling resource information may be provided as information indicating the corresponding pattern. In yet another example, the micro-terminal scheduling resource information may be provided as an index of a sub-frame that is to be used for the uplink transmission of the micro-terminal or as a sub-frame allocation pattern.

The micro base station (3) may transmit the micro-terminal scheduling resource information to the terminal within its servicing area (S22). Herein, the terminals located within the servicing area of the micro base station include macro-terminals (2) adjacent to the micro base station while served by the macro base station and micro-terminals being served by the micro base station. In step S22, the micro-terminal scheduling resource information may be transmitted by the micro base station (3) through a physical channel or a broadcast channel.

In case the micro-terminal scheduling resource information is broadcasted through a broadcast channel, the micro-terminal scheduling resource information may be transmitted as system information (SI) in a semi-static format, so that even a macro-terminal (2) that is not served by the micro base station can receive the micro-terminal scheduling resource information.

Meanwhile, in case a specific physical channel assigned (or allocated) to the macro-terminal (2) is used for transmitting micro-terminal scheduling resource information, an uplink transmission control may be performed more dynamic than using broadcast. For example, the micro-terminal scheduling resource information may be acquired as information included in a PDCCH, when the macro-terminal (2) reads the corresponding PDCCH being masked by a specific RNTI, or the micro-terminal scheduling resource information may be acquired as information included in a PDSCH indicated by a PDCCH masked by a specific RNTI. Herein, the specific RNTI may be defined as a broadcast-specific RNTI for inter-cell interference coordination. And, when required, the macro base station or the micro base station may notify the macro-terminal of the RNTI that is to be used for the above-described purpose.

The macro-terminal (2) analyzes the micro-terminal scheduling resource information (information generated by the micro base station in step S21) which is received as described above, and an uplink resource which is currently allocated to the macro-terminal (2) itself, thereby being capable of determining which uplink resource is being overlapped, i.e., the macro-terminal (2) may determine which uplink resource can cause the inter-cell interference. Therefore, the macro-terminal (2) may transmit SRS with reducing the transmission power of the SRS or setting the SRS transmission power to '0' for the corresponding resource where inter-cell interference may occur (S23). Herein, it should be noted that, although it is defined in the conventional 3GPP LTE system that the SRS transmission power is to have a constant value throughout the entire band, in the description of the present invention, it is proposed that the SRS transmission power is set up differently for each specific resource (partial frequency resource or sub-band). Accordingly, in case the transmission power of the SRS for a certain resource from the macro-terminal (2) is low or 0, the macro base station (1) does not allocate the corresponding resource to the macro-terminal (2), and the inter-cell interference may be reduced.

Meanwhile, according to another embodiment of step S23 of the present invention, the macro-terminal (2) may transmit the received micro-terminal scheduling resource information (information generated by the micro base station in step S21) to the macro base station (1) (S23). At this point, the macro-terminal (2) may directly transmit the micro-terminal scheduling resource information, or process and transmit the micro-terminal scheduling resource information to the macro base station (1). Herein, for example, the processing of the received micro-terminal scheduling resource information may include analyzing the received micro-terminal scheduling resource information (information generated by the micro base station in step S21) and an uplink resource currently set-up to the macro-terminal (2) itself, and generating an indicator indicating an overlapping uplink resource, i.e., an indicator indicating an uplink resource that can generate inter-cell interference.

In step S24, based upon the information transmitted by the macro-terminal (2), the macro base station (1) may direct an uplink scheduling to be performed to the macro-terminal (2) by avoiding the corresponding uplink resource, or may direct an uplink transmission power of the macro-terminal (2) to be reduced in the corresponding uplink resource.

As described above, the macro-terminal (2) receiving the micro-terminal scheduling resource information may be operated so as to enable a macro cell to recognize the possible occurrence of a critical interference to a neighboring micro cell, if an uplink of the macro-terminal (2) is scheduled in a specific resource. Also, the macro base station (1) recognizing the specific resource may perform the operations of avoiding the corresponding resource when scheduling the uplink for the macro-terminal (2), or reducing the uplink transmission power of the macro-terminal when the corresponding resource is to be scheduled. Accordingly, the inter-cell interference may be reduced.

FIG. 8 illustrates a signal flow chart showing an uplink transmission control method according to another embodiment of the present invention. In the description of the embodiment shown in FIG. 8, only the details that are different from the embodiment shown in FIG. 7 will be described. And, the description of the similar details will be omitted for simplicity.

As shown in FIG. 8, the micro base station (3) may transmit scheduling information for a resource, which can be used by a micro-terminal for an uplink transmission, to the micro-terminal (4) through a physical channel. At this point, the macro-terminal (2) may receive the information being transmitted through the physical channel (S32).

At this point, the macro-terminal (2) may directly read (this may also be referred to as "sniffing") the PDCCH that is masked by the RNTI of the micro-terminal (4), and may acquire the micro-terminal scheduling resource information included in the corresponding PDCCH (S32). At this point, the method enabling the macro-terminal (2) to acquire the RNTI of the micro-terminal (4) may correspond to having the micro base station (3) broadcast the RNTI of the micro-terminal (4) in the form of system information (SI), or may correspond to limiting in advance the RNTI of the micro-terminal (4) that can be used by the micro base station (3) and having the macro cell base station (1) transmit the limited RNTI of the micro-terminal (4) to the macro-terminal (2).

As described in the embodiment shown in FIG. 8, when the macro-terminal (2) directly reads the PDCCH of the micro-terminal (4), the micro base station (3) is not required to separately generate or transmit information on the uplink scheduling of the micro-terminal (4) for the macro-terminal (2) as described in the embodiment shown in FIG. 7. More specifically, the process steps S21 and S22 of FIG. 7 are not required to be performed in the embodiment shown in FIG. 8.

By performing the process step S32, the macro-terminal (2) receiving the micro-terminal scheduling resource information may transmit an explicit signal that the macro base station (1) can recognize the uplink scheduling information of the micro cell or perform operations producing similar effects. More specifically, in FIG. 8, the process steps S33 and S34 are performed. The process steps S33 and S34 of FIG. 8 respectively correspond to the process steps S23 and S24 of FIG. 7. Therefore, the description for the corresponding process steps of FIG. 7 will be directly applied to the description of the respective process steps in FIG. 8.

More specifically, the macro-terminal (2) decodes the PDCCH of the micro-terminal (4) so as to acquire resource information on the uplink scheduling of the micro-terminal (4). Also, the macro-terminal (2) analyzes the micro-terminal scheduling resource information acquired in step S32 and the uplink resource being scheduled to the macro-terminal (2) itself by the macro base station (1), thereby being capable of determining which uplink resource may cause the inter-cell interference. Therefore, the macro-terminal (2) may reduce or set to '0' the transmission power of the SRS for the corresponding resource that may cause the inter-cell interference (S33). Alternatively, the macro-terminal (2) may transmit the micro-terminal scheduling resource information acquired in step S32 to the macro base station (1) (S33). At this point, the macro-terminal (2) may directly transmit or process and transmit the resource information acquired in step S32 to the macro base station (1). Accordingly, the macro base station (1) may avoid the corresponding resource when scheduling uplink transmission of the macro-terminal (2), or the macro base station (1) may direct the uplink transmission power of the macro-terminal (2) for the corresponding resource to be reduced (S34).

The above-described embodiments of the present invention shown in FIG. 7 and FIG. 8 respectively describe a proposed method of having the macro-terminal (2), which has received or acquired uplink scheduling resource information on the micro-terminal (4) of the micro base station (3), report the corresponding resource information (i.e., information on the resource that may cause inter-cell inference) to the macro base station (1) by using an indirect method (such as a method of reducing the SRS transmission power). Alternatively, the macro-terminal (2) may also transmit an explicit signal by using a direct method, wherein the explicit signal requests not to perform uplink scheduling for the macro-terminal itself in the resource that may cause the inter-cell interference. This explicit signal may be transmitted to the macro base station (1) by the macro-terminal (2) through a higher layer signal or a physical channel. At this point, the position of a specific resource where uplink scheduling is to be avoided may be indicated in the form of a pattern or bitmap.

As described above, the explicit signal requesting not to perform the uplink scheduling on a specific resource may be defined in a subsequent release (e.g., Release-10 and up) of the 3GPP LTE standard. Since the uplink scheduling of the macro base station and the macro-terminal according to the conventional 3GPP LTE system (e.g., Release-8 or 9) cannot be controlled by the explicit signal mentioned above, a method of reducing or setting to '0' the SRS transmission power for the corresponding resource and transmitting the SRS in a sub-band format may be taken into consideration.

The SRS transmission power is defined as shown in Equation 9 above. According to Equation 9, the SRS transmission power of a user equipment in sub-frame i may be basically decided by parameters, which are decided in accordance with a higher layer signal, and a path loss (PL) that is measured by the user equipment up to the respective base station. However, the SRS transmission power does not exceed the maximum allowable power (PCMAX) given to the user equipment.

In the SRS transmission power decided as shown in Equation 9, a frequency position is not taken into consideration. More specifically, in a sub-frame, the SRS transmission power may only be decided to have a constant value through the entire band and cannot be decided to have different values in some portion of the band (sub-band). However, since the above-described inter-cell interference occurs within a portion of the resource (a portion of the frequency band or a portion of the component carrier) at a specific point of time, it is required not to schedule any uplink transmission of the macro-terminal in the corresponding portion of the resource. Accordingly, when the SRS transmission power from the macro-terminal is reduced or set to '0' in the corresponding portion of the resource (frequency band), the macro base station receiving such SRS may not perform uplink scheduling of the macro-terminal in the corresponding portion of the resource, or the macro base station may direct the uplink transmission power of the macro-terminal to be reduced in the corresponding portion of the resource. Hereinafter, an embodiment of the present invention deciding the SRS transmission power for the above-described portion of the resource (frequency band) will now be described in detail.

In addition to the above-described Equation 9, the micro base station may take into consideration the information on a frequency resource that is used in the uplink scheduling (for the micro-terminal) and the path loss up to the micro base station ($PL_{micro}$). The respective SRS transmission power may be defined to satisfy the conditions shown in Equation 10 below.

Figure 10:
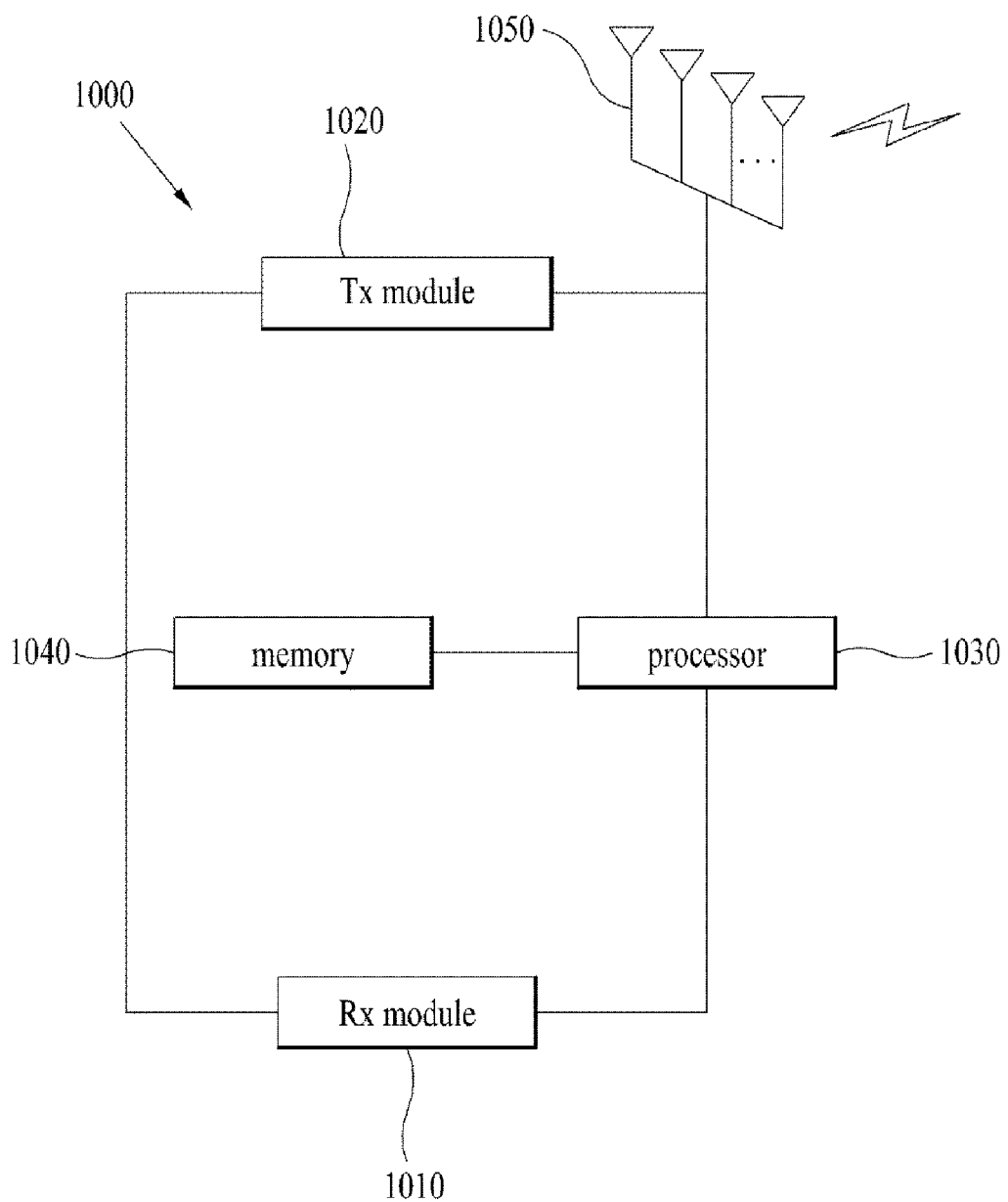
FIG. 10 illustrates the structure of a base station device or a terminal device according to a preferred embodiment of the present invention.

Math FIG. 10

$$P_{SRS\_OFFSET} + 10\log_{10}(M_{SRS}) + P_{O\_PUSCH}(j) + \alpha(j) \cdot PL + f(i) - \beta \cdot PL_{micro} < \text{Threshold}(k) \quad [\text{Math.10}]$$

Referring to Equation 10, k corresponds to an index indicating the position of a frequency resource used by the micro base station in the uplink scheduling (for the micro-terminal). For example, k may correspond to an index indicating a specific sub-band configured of one or more resource blocks (RB). β corresponds to a value scaling the path loss ($PL_{micro}$) from the macro-terminal to the micro base station. Herein, β corresponds to a value indicating how much the $PL_{micro}$ will be taken into consideration in the SRS transmission power. The value β may be determined by the base station and may be determined to be equal to or greater than '0'. For example, the value β may be equal to '1', and this indicates that the $PL_{micro}$ is directly applied without modification. When the value β is less than '1', this indicates that the $PL_{micro}$ is reflected less. On the other hand, when the value β is greater than '1', this indicates that the $PL_{micro}$ is reflected more. Threshold(k) corresponds to a value being determined in accordance with the sub-band index k. Herein, Threshold(k) signifies a threshold value deciding the extent to which the micro base station will allow an interference to occur in the SRS transmission of the macro-terminal.

As an example of an SRS power control equation reflecting the additional condition, a new threshold vale may be added as shown in Equation 11 below.

Math FIG. 11

$$P_{SRS}(i,k) = \min\{P_{SRS}(i), \text{Threshold}(k) + \beta \cdot PL_{micro}\}[\text{dBm}] \quad [\text{Math.11}]$$

Alternatively, as another example, as a new parameter that can indicate a threshold tolerance value of the micro base station according to k and $PL_{micro}$, $\Delta(k, PL_{micro})$ may be added as shown in Equation 12 below.

Math FIG. 12

$$P_{SRS}(i,k) = \min\{P_{CMAX}, P_{SRS\_OFFSET} + 10\log_{10}(M_{SRS}) + P_{O\_PUSCH}(j) + \alpha(j) \cdot PL + f(i) - \Delta(k, PL_{micro})\}[\text{dBm}] \quad [\text{Math.12}]$$

Alternatively, a new parameter $P_{SRS\_OFFSET}$ taking into consideration k and $PL_{micro}$ may be set up as shown in Equation 13 below.

Math FIG. 13

$$P_{SRS}(i,k) = \min\{P_{CMAX}, P_{SRS\_OFFSET}(k, PL_{micro}) + 10\log_{10}(M_{SRS}) + P_{O\_PUSCH}(j) + \alpha(j) \cdot PL + f(i)\}[\text{dBm}] \quad [\text{Math.13}]$$

Alternatively, as another example, by setting up the SRS transmission power of a specific sub-band that cannot satisfy the conditions of Equation 10 to '0', the sub-band SRS may be transmitted by using an on/off method.

The nature of Equation 10 to Equation 13 relates to regulating or controlling the SRS transmission power of the macro-terminal for each sub-band in accordance with the frequency resource, which is used by a neighboring micro base station in an uplink scheduling (for a micro-terminal). In order to do so, the path loss to the micro base station and/or a threshold value respective to a specific frequency resource are/is reflected in the SRS power control of the macro-terminal. However, this is merely exemplary, and, therefore, the present invention will not be limited to the example given herein.

Unlike in the conventional method (wherein the SRS transmission power is constant throughout the entire band), the SRS transmission power set up as described above is differently set for each sub-band. Therefore, as shown in FIG. 9, the user equipment may have a plurality of SRS transmission power levels respective to each sub-band. In order to transmit SRSs each having a different transmission power depending upon the frequency resource, the present invention proposes a method of transmitting the SRS corresponding to each sub-band over a plurality of sub-frames or transmitting the SRS via one subframe with respect to the entire frequency band.

In order to transmit the SRS corresponding to each sub-band over a plurality of sub-frames, the SRS (transmission power A) for sub-band 1 is transmitted in a 1st sub-frame, the SRS (transmission power B) for sub-band 2 is transmitted in a 2nd sub-frame, and the SRS (transmission power C) for sub-band 3 is transmitted in a 3rd sub-frame. Herein, when transmitting SRS for sub-band 1 in the 1st sub-frame, the SRS for another sub-band (e.g., sub-band 2 and 3) that does not correspond to the 1st sub-frame may not be transmitted.

Meanwhile, in case the SRS having a different transmission power for each sub-band is transmitted via a single transmission (i.e., one sub-frame) with respect to the entire frequency band, the SRS transmission power may be set up by using a type of filter that interpolates the SRS transmission power values corresponding to each sub-band, as marked in dotted lines shown in FIG. 9. More specifically, by using the above-described power filter for the SRS transmission at the transmitting end of the user terminal, the SRS having a different transmission power for each sub-band in a single sub-frame may be transmitted.

The above-described method for an uplink scheduling according to the embodiment of the present invention may be considered for different base stations (1st and 2nd base stations) and for user equipments (1st and 2nd user equipment) being served by each base station.

First of all, when describing an embodiment of the present invention for the 1st base station (macro base station), a method for the 1st base station performing uplink scheduling on a 1st user equipment (e.g., macro user equipment) may be expressed by receiving information on a frequency band in which an uplink interference for a 2nd base station (e.g., micro base station) may occur from the 1st user equipment, and by allocating uplink resource for the 1st user equipment based upon the corresponding frequency band. Herein, the frequency band, in which an uplink interference for the 2nd base station may occur, may be decided based upon uplink scheduling information on a 2nd user equipment (e.g., micro user equipment) of the 2nd base station. Furthermore, the uplink scheduling information on the 2nd user equipment of the 2nd base station may be acquired by the 1st user equipment, thereby being transmitted to the 1st base station.

Meanwhile, when describing another embodiment of the present invention for the 1st user equipment, a method for the 1st user equipment transmitting an uplink signal to the 1st base station may be expressed by acquiring uplink scheduling information on the 2nd user equipment of the 2nd base station, by deciding the frequency band, in which an uplink transmission to the 1st base station from the 1st user equipment causes an interference with the 2nd base station, based upon the acquired uplink scheduling information, by transmitting the information on the decided frequency band to the 1st base station, by being allocated with an uplink resource from the 1st base station based on the frequency band, and by transmitting the uplink signal to the 1st base station.

The following details may be commonly taken into consideration with respect to the methods according to the present invention, which have been respectively described above for the 1st base station and the 1st user equipment (macro base station and macro user equipment).

Firstly, the frequency band, wherein an uplink interference occurs with respect to the 2nd base station (micro base station), may be decided as a frequency band having an uplink frequency band scheduled for the 1st user equipment overlapping with an uplink frequency band scheduled for the 2nd user equipment (micro user equipment). Additionally, the step of allocating an uplink resource for the 1st user equipment may include allocating an uplink resource for the 1st user equipment with the exception for the frequency band having an interference occurring therein, and setting up an uplink transmission power of the 1st user equipment in a frequency band having an interference occurring therein to a level lower than those of other frequency bands.

The information on the frequency band having an interference occurring therein may be informed to the 1st base station by adjusting the SRS transmission power. More specifically, an SRS may be transmitted from the 1st user equipment, in a frequency band having an interference occurring therein, at a transmission power lower than those of other frequency bands, or at a transmission power being set to '0'. Accordingly, the 1st base station may not allocate the corresponding frequency band to the 1st user equipment. Herein, the transmission power of the SRS may be decided while taking into consideration the uplink scheduling information on the 2nd user equipment of the 2nd base station and the path loss from the 1st user equipment to the 2nd base station. Furthermore, the SRS transmission power may be set up to a different transmission power for each frequency band.

The uplink scheduling information on the 2nd user equipment of the 2nd base station may be acquired by the 1st user equipment via one of broadcasting from the 2nd base station and physical channel from the 2nd base station to the 1st user equipment. Herein, the transmission via the physical channel may be performed through a PDCCH masked by an RNTI for regulating inter-cell interference or by an RNTI of the 2nd user equipment. Herein, the RNTI of the 2nd user equipment may be broadcasted by the 2nd base station or may be indicated as a pre-defined RNTI to the 1st user equipment by the 1st base station.

By using the above-described embodiments of the present invention, in performing an uplink scheduling on a macro-terminal, the macro base station may not schedule the macro-terminal to the corresponding resource (frequency resource having an uplink interference occurring therein with respect to the micro base station). Or, even if the scheduling is performed on the corresponding resource, the macro base station may direct the uplink transmission power of the PUSCH, SRS, and so on of the macro-terminal to be reduced.

FIG. 10 illustrates the structure of a base station device or a terminal device according to a preferred embodiment of the present invention.

Referring to FIG. 10, a base station device 1000 according to the present invention may include a receiving module 1010, a transmitting module 1020, a processor 1030, a memory 1040, and a plurality of antennae 1050. Herein, the plurality of antennae signifies that the base station device of FIG. 10 supports MIMO transmission and/or reception.

The receiving module 1010 may receive various types of signals, data, and information via the uplink from the user equipment. The transmitting module 1020 may transmit various types of signals, data, and information via downlink to the user equipment. The processor 1030 may control the overall operations of the base station device 1000.

The macro base station (1st base station) according to an embodiment of the present invention may perform uplink scheduling on the macro-terminal (1st user equipment). The processor 1030 of the macro base station may be configured to receive information on a frequency band, the frequency band having an uplink interference occurring therein from the macro-terminal with respect to the micro base station (2nd base station), through the receiving module 1010, and to allocate an uplink resource for the macro-terminal based upon the respective frequency band. Herein, the frequency band having an uplink interference occurring therein with respect to the micro base station may be decided based upon uplink scheduling information on the micro-terminal (2nd user equipment) of the micro base station. Furthermore, the uplink scheduling information on the micro-terminal of the micro base station may be acquired by the macro user equipment, thereby being transmitted to the macro base station.

The above-mentioned description of the various embodiments of the present invention may be applied for the further details on the uplink scheduling performed by the base station.

Meanwhile, referring to FIG. 10, a user equipment (or terminal) device 1000 according to the present invention may include a receiving module 1010, a transmitting module 1020, a processor 1030, a memory 1040, and a plurality of antennae 1050. Herein, the plurality of antennae signifies that the user equipment device of FIG. 10 supports MIMO transmission and/or reception.

The receiving module 1010 may receive various types of signals, data, and information via the downlink from the base station. The transmitting module 1020 may transmit various types of signals, data, and information via uplink to the base station. The processor 1030 may control the overall operations of the user equipment device 1000.

The macro-terminal (1st user equipment) according to the embodiment of the present invention may transmit an uplink signal to the macro base station via uplink scheduling of the macro base station (1st base station). The processor 1030 of the macro-terminal may be configured to acquire uplink scheduling information on the micro-terminal (2nd user equipment) of the micro base station (2nd base station), deciding a frequency band, wherein an uplink transmission from the macro-terminal to the macro base station causes interference with the micro base station, based upon the uplink scheduling information on the micro-terminal of the micro base station, and to transmit information on the respective frequency band to the macro base station through the transmitting module 1020. Additionally, the processor 1030 may be configured to be allocated with an uplink resource from the macro base station based upon the respective frequency band, and to transmit an uplink signal to the macro base station through the transmitting module 1020 based upon the allocated resource.

The above-mentioned description of the various embodiments of the present invention may be applied for the further details on the uplink signal transmission performed by the user equipment.

Additionally, the processor of the base station device or the processor of the user equipment device may perform functions of operating and processing information received by the base station device or the user equipment device, information that is to be transmitted outside the system, and so on. Furthermore, the memory 1040 may store the operated and processed information for a predetermined period of time. Herein, the memory 1040 may also be replaced by other components such as a buffer (not shown).

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described embodiments of the present invention may be applied to a wide range of mobile communications systems.

The invention claimed is:

1. A method for performing uplink scheduling for a first user equipment by a first base station, the method comprising:
   receiving, by the first base station from the first user equipment, a sounding reference signal (SRS) on a frequency band having an uplink interference occurring therein with respect to a second base station, the SRS being transmitted by the first user equipment at a transmission power set to a power level lower than those of other frequency bands, or at a transmission power set to '0'; and
   allocating, by the first base station, an uplink resource for the first user equipment based upon the frequency band, wherein the frequency band is decided by the first base station based upon uplink scheduling information on a second user equipment of the second base station,
   wherein the transmission power of the SRS is decided considering the uplink scheduling information and a path loss from the first user equipment to the second base station, and
   wherein the uplink scheduling information is acquired by the first user equipment and transmitted to the first base station.

2. The method of claim 1, wherein the frequency band having an uplink interference occurring therein with respect to the second base station is decided as a frequency band having an uplink frequency band scheduled to the first user equipment overlap with an uplink frequency band scheduled to the second user equipment.

3. The method of claim 1, wherein the allocating an uplink resource for the first user equipment comprises:
   allocating an uplink resource for the first user equipment excluding the frequency band, or setting up an uplink transmission power of the first user equipment in the frequency band to a transmission power level lower than those of other frequency bands.

4. The method of claim 1, wherein the SRS transmission power is set up differently for each frequency band.

5. The method of claim 1, wherein the uplink scheduling information on the second user equipment of the second base station is acquired by the first user equipment through one of a transmission via broadcasting from the second base station and a transmission via physical channel to the first user equipment from the second base station.

6. The method of claim 5, wherein the transmission via physical channel to the first user equipment from the second base station is performed through a physical downlink control channel (PDCCH) masked by a Radio Network Temporary Identifier (RNTI) for regulating inter-cell interference or by an RNTI of the second user equipment.

7. The method of claim 6, wherein the RNTI of the second user equipment is broadcasted by the second base station, or wherein the RNTI of the second user equipment is designated to the first user equipment by the first base station as a pre-defined RNTI.

8. A method for transmitting an uplink signal from a first user equipment to a first base station, the method comprising:
   acquiring uplink scheduling information on a second user equipment of a second base station;
   deciding a frequency band, wherein an uplink transmission from the first user equipment to the first base station causes an interference with the second base station, based upon the uplink scheduling information on the second user equipment of the second base station;
   transmitting a sounding reference signal (SRS) on the frequency band to the first base station at a transmission power set to a power level lower than those of other frequency bands, or at a transmission power set to '0', the transmission power of the SRS being decided considering the uplink scheduling information on the second user equipment of the second base station and a path loss from the first user equipment to the second base station;
   receiving an uplink resource allocation based upon the frequency band from the first base station; and
   transmitting an uplink signal to the first base station based upon the allocated resource.

9. The method of claim 8, wherein the frequency band having an uplink interference occurring therein with respect to the second base station is decided as a frequency band having an uplink frequency band scheduled to the first user equipment overlap with an uplink frequency band scheduled to the second user equipment.

10. The method of claim 8, wherein the receiving uplink resource allocation from the first base station comprises receiving uplink resource allocation excluding the frequency band, or setting up an uplink transmission power in the frequency band to a transmission power level lower than those of other frequency bands.

11. The method of claim 8, wherein the SRS transmission power is set up differently for each frequency band.

12. The method of claim 8, wherein the step of acquiring uplink scheduling information on the second user equipment of the second base station is performed by the first user equipment through one of a transmission via broadcasting from the second base station and a transmission via physical channel to the first user equipment from the second base station.

13. The method of claim 12, wherein the transmission via physical channel to the first user equipment from the second base station is performed through a physical downlink control channel (PDCCH) masked by a Radio Network Temporary Identifier (RNTI) for regulating inter-cell interference or by an RNTI of the second user equipment.

14. The method of claim 13, wherein the RNTI of the second user equipment is broadcasted by the second base station, or wherein the RNTI of the second user equipment is designated to the first user equipment by the first base station as a pre-defined RNTI.

15. A first base station for performing uplink scheduling to a first user equipment, the first base station comprising:
   a receiver configured to receive an uplink signal from the first user equipment;
   a transmitter configured to transmit a downlink signal to the first user equipment; and
   a processor configured to control the receiver and the transmitter, the processor is further configured to:
      receive, from the first user equipment, a sounding reference signal (SRS) on a frequency band having an uplink interference occurring therein with respect to a second base station, the SRS being transmitted by the first user equipment at a transmission power set to a power level lower than those of other frequency bands, or at a transmission power set to '0', and allocate an uplink resource for the first user equipment based upon the frequency band, wherein the frequency band is decided by the first base station based upon uplink scheduling information on a second user equipment of the second base station, wherein the transmission power of the SRS is decided considering the uplink scheduling information and a path loss from the first user equipment to the second base station, and wherein the uplink scheduling information is acquired by the first user equipment and transmitted to the first base station.

16. A first user equipment for transmitting an uplink signal to a first base station, the first user equipment comprising:

a receiver configured to receive a downlink signal from the first base station;

a transmitter configured to transmit an uplink signal to the first base station; and a processor configured to control the receiver and the transmitter, the processor is further configured to:

acquire uplink scheduling information on a second user equipment of a second base station;

decide a frequency band, wherein an uplink transmission from the first user equipment to the first base station causes an interference with the second base station, based upon the uplink scheduling information on the second user equipment of the second base station, and transmit a sounding reference signal (SRS) on the frequency band to the first base station at a transmission power set to a power level lower than those of other frequency bands, or at a transmission power set to '0', the transmission power of the SRS being decided considering the uplink scheduling information on the second user equipment of the second base station and a path loss from the first user equipment to the second base station;

receive uplink resource allocation based upon the frequency band from the first base station; and transmit an uplink signal to the first base station based upon the allocated resource.

* * * * *